(12) United States Patent
Liubakka et al.

(10) Patent No.: US 8,490,904 B2
(45) Date of Patent: Jul. 23, 2013

(54) SYSTEM AND METHOD FOR RECOVERING MINERALS

(75) Inventors: Gary M. Liubakka, Hibbing, MN (US);
Timothy L. Sullivan, Nashwauk, MN (US); Daniel E. Lamphere, Hibbing, MN (US); Gary J. Corradi, Hibbing, MN (US); Kendall J. Dykhuis, Hibbing, MN (US)

(73) Assignee: Phoenix Environmental Reclamation, Hibbing, MN (US)

( * ) Notice: Subject to any disclaimer, the term of this patent is extended or adjusted under 35 U.S.C. 154(b) by 0 days.

(21) Appl. No.: 13/284,374

(22) Filed: Oct. 28, 2011

(65) Prior Publication Data

US 2012/0043314 A1 Feb. 23, 2012

Related U.S. Application Data

(62) Division of application No. 12/761,362, filed on Apr. 15, 2010, now Pat. No. 8,066,794.

(60) Provisional application No. 61/169,563, filed on Apr. 15, 2009.

(51) Int. Cl.
*B02C 19/18* (2006.01)

(52) U.S. Cl.
USPC .......................... 241/65; 241/152.2; 241/301

(58) Field of Classification Search
USPC ........ 241/1, 301, 29, 23, 65, 152.2; 75/10.13; 219/678
See application file for complete search history.

(56) References Cited

U.S. PATENT DOCUMENTS

| | | | |
|---|---|---|---|
| 2,946,657 A | 7/1960 | Reynolds, Jr. | |
| 3,460,766 A * | 8/1969 | Sarapuu | 241/1 |
| 3,811,623 A | 5/1974 | Speer | |
| 3,992,287 A | 11/1976 | Rhys | |
| 4,313,573 A | 2/1982 | Goldberger et al. | |
| 4,321,089 A | 3/1982 | Kruesi et al. | |
| 4,324,582 A | 4/1982 | Kruesi et al. | |
| 4,376,034 A | 3/1983 | Wall | |
| 4,419,214 A | 12/1983 | Balint et al. | |

(Continued)

FOREIGN PATENT DOCUMENTS

CN 1749421 3/2006

OTHER PUBLICATIONS

Decrepitation. (n.d.). Dictionary.com Unabridged. Retrieved Feb. 21, 2012, from Dictionary.com website: http://dictionary.reference.com/browse/decrepitation.

(Continued)

*Primary Examiner* — Mark Rosenbaum
(74) *Attorney, Agent, or Firm* — Dicke, Billig, Czaja, PLLC

(57) ABSTRACT

One aspect is a method of recovering minerals. The method includes heating aggregated minerals with microwave energy. The aggregated minerals consists of at least a first and a second mineral bound together, the first and second minerals each having different differential thermal expansion rates such that fractures occur between the minerals of the aggregated minerals. The fractured minerals are subjected to microwave heating to induce fractures between and separation of the at least first and second minerals, and also to ultrasound energy causing further size reduction. The fractured and size-reduced minerals are heated with microwave energy. The fractured and size-reduced minerals consist of metal-containing materials, such that metal-containing materials are heated to at least the melting temperature of one of the metals in the metal-containing materials.

15 Claims, 7 Drawing Sheets

U.S. PATENT DOCUMENTS

| | | | |
|---|---|---|---|
| 4,655,276 | A | 4/1987 | Bird et al. |
| 4,880,578 | A | 11/1989 | Holcombe et al. |
| 5,003,144 | A | 3/1991 | Lindroth et al. |
| 5,131,941 | A | 7/1992 | Lemelson |
| 5,211,923 | A | 5/1993 | Harkness et al. |
| 5,280,149 | A | 1/1994 | Schneider et al. |
| 5,393,320 | A | 2/1995 | Gomez |
| 5,397,530 | A | 3/1995 | Narasimhan et al. |
| 5,824,133 | A | 10/1998 | Tranquilla |
| 5,858,037 | A | 1/1999 | Sukumaran Jayan et al. |
| 5,911,885 | A | 6/1999 | Owens |
| 6,104,015 | A | 8/2000 | Jayan et al. |
| 6,211,499 | B1 | 4/2001 | Morrow et al. |
| 6,277,168 | B1 | 8/2001 | Huang et al. |
| 6,669,756 | B2 | 12/2003 | Urabe et al. |
| 6,712,298 | B2 | 3/2004 | Kohlberg et al. |
| 6,923,328 | B2 | 8/2005 | Birken |
| 7,459,006 | B2 | 12/2008 | Ridler |
| 7,476,829 | B2 | 1/2009 | Kingman |
| 2005/0150327 | A1 | 7/2005 | Morrell et al. |
| 2007/0209480 | A1 | 9/2007 | Eisele et al. |
| 2008/0087135 | A1 | 4/2008 | Hwang et al. |
| 2010/0263482 | A1 | 10/2010 | Liubakka et al. |
| 2010/0263483 | A1 | 10/2010 | Liubakka et al. |
| 2010/0264136 | A1 | 10/2010 | Liubakka et al. |
| 2010/0264241 | A1 | 10/2010 | Liubakka et al. |

OTHER PUBLICATIONS

Office Action for U.S. Appl. No. 12/761,359 mailed Oct. 5, 2012 (23 pages).

Final Office Action for U.S. Appl. No. 12/761,361 mailed Feb. 22, 2012 (8 pages).

Office Action for U.S. Appl. No. 12/761,357 mailed Feb. 10, 2012 (13 pages).

Chen, T.T., "The Relative Transparency of Minerals to Microwave Radiation," Canadian Metallurgical Quarterly, vol. 23, No. 3. pp. 349-351 (1984).

Vorster, W., "The Effect of Microwave Radiation upon the Processing of Neves Corvo Copper Ore," International Journal of Mineral Processing, vol. 63, pp. 29-44 (2001).

Office Action for U.S. Appl. No. 12/761,361 mailed Jul. 19, 2011 (14 pages).

Notice of Allowance for U.S. Appl. No. 12/761,362 mailed Jul. 21, 2011 (14 pages).

* cited by examiner

SYSTEM AND METHOD FOR RECOVERING MINERALS

CROSS-REFERENCE TO RELATED APPLICATIONS

This application is a divisional of U.S. patent application Ser. No. 12/761,362, entitled "SYSTEM AND METHOD FOR RECOVERING MINERALS," having a filing date of Apr. 15, 2010, which claims priority under 35 U.S.C. §119(e) to U.S. Provisional Patent Application Ser. No. 61/169,563 entitled "RECLAMATION SYSTEM," having a filing date of Apr. 15, 2009 and which are both incorporated herein by reference.

This patent application is also related to Utility patent applications filed on Apr. 15, 2010, having Ser. No. 12/761,357, entitled "ULTRASONIC CRUSHING APPARATUS AND METHOD"; Ser. No. 12/761,359, entitled "MICROWAVE PELLET FURNACE AND METHOD"; and Ser. No. 12/761,361, entitled "SEPARATOR AND CRUSHER OF MINERALS WITH MICROWAVE ENERGY AND METHOD THEREOF".

BACKGROUND

One aspect relates to a system and method of recovering minerals using microwave and ultrasound energy. Throughout the world, there are quantities of minerals combined with other material. Often, attempts are made to separate materials. For example, ores are treated by mechanical, chemical, or thermal processes, or some combination thereof to liberate marketable minerals from waste minerals (called gangue).

In many mining districts enormous quantities of mineral resources are not utilized because mining and/or mineral processing to recover the marketable constituents is uneconomical. Additional quantities of desired minerals are locked to gangue minerals and are rejected during mining or mineral processing and are sent to stockpiles or tailing basins.

Billions of tons of unmined minerals, mined minerals disposed of in stockpiles and tailing basins, and other waste materials in landfills would be utilized if processing costs for separating gangue from valuable minerals were significantly reduced.

For these and other reasons, there is a need for the present embodiments.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

Figure 1:
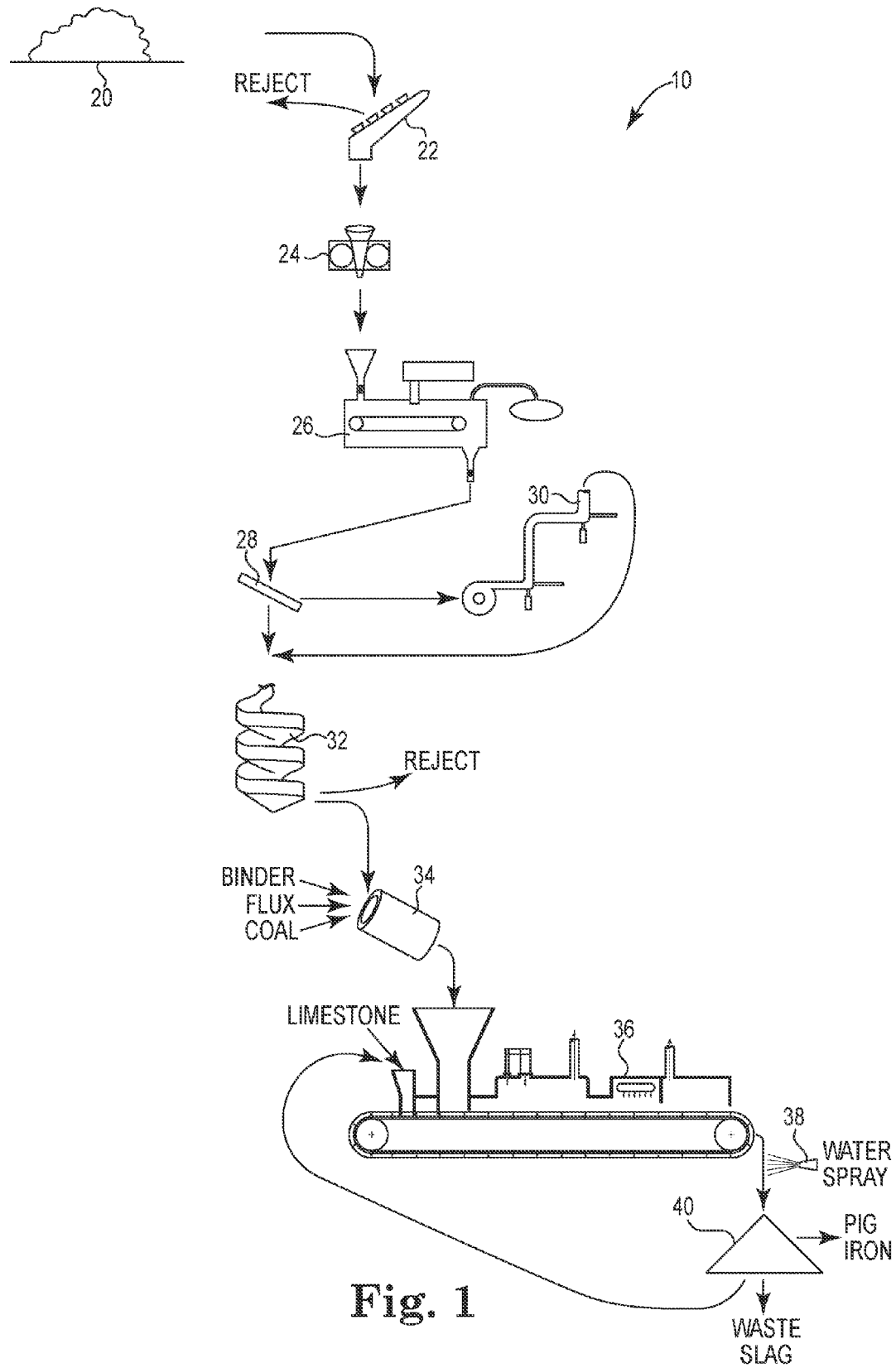
FIG. 1 illustrates a system of recovering minerals using microwave and ultrasound energy in accordance with one embodiment.

FIG. 1 illustrates recovery system 10 in accordance with one embodiment. In one embodiment, system 10 includes grizzly 22, high pressure grinding roll (HPGR) crusher 24, microwave cracker 26, screen 28, sonic crusher 30, spiral classifier 32, balling drum 34, pellet furnace 36 and separator 40. In one embodiment, system 10 is used to treat materials in a waste stockpile 20, in order to recover certain usable minerals.

In one embodiment, recovery system 10 treats waste aggregated minerals from a stockpile 20. In one example, included in the waste aggregated minerals of stockpile 20 is iron ore, such as that found at an abandoned iron ore mine. In one example, stockpile 20 contains roughly one million tons of rock composed of about 65% iron oxides (mostly hematite, with some magnetite) and 35% $SiO_2$, with less than 1% phosphorus and aluminum oxide. In one embodiment, recovery system 10 treats a stockpile 20 that has waste material found in the Iron Range of Northern Minnesota.

In one embodiment, recovery system 10 first processes waste stockpile 20 to reduce its aggregated mineral components in size by crushing and grinding them. Then, it separate minerals from gangue using elutriation, screening, and classifying. It then agglomerates by mixing ore with a binder, a reductant or an oxidizer, a flux, and makes a "green" pellet. The green pellets are then reduced to metallic form.

In one embodiment, recovery system 10 first processes waste stockpile 20 passing it through a grizzly, that is, a large, rough screen used for preliminary screening of processed material. In one embodiment, recovery system 10 includes grizzly 22 such that iron ore is removed from stockpile 20 and run through grizzly 22. In one embodiment, grizzly 22 is a large, rough screen made of parallel steel bars spaced one and one half inches to up to three feet apart. Grizzly 22 can be used as a first step in sorting material, and may serve to keep boulders and trash from clogging or damaging the remaining elements of recovery system 10. In one example, oversized material is typically low in iron content, high in silica, and is therefore rejected and discarded. In one example, any material that is larger than one and one half inches, will not fit though grizzly 22 and is discarded.

In one embodiment, recovery system 10 includes HPGR crusher 24. In one example, HPGR crusher 24 is a high pressure grinding roll that uses two parallel rollers to crush rock passing between the rollers. The rolls are set at a given spacing and held at that spacing by large hydraulic rams while the rolls are given a rotary motion inward and downward by electric motors, pulling rock between the rolls and crushing it until it passes through the set gap. In one example, HPGR crusher 24 serves the same role as a jaw or gyratory crusher, such as used in a gravel pit. In one embodiment, HPGR crusher 24 is set to ¼ inch outlet size, such that iron ore received from the output of grizzly 22 is run through HPGR crusher 24 and ground until ¼ inch size is reached for the material to pass through the outlet of HPGR crusher 24.

In one embodiment, recovery system 10 also includes microwave cracker 26, and in one case, the ¼ inch size iron ore material output from HPGR crusher 24 is sent into microwave cracker 26. In one embodiment, microwave cracker 26 is configured to receive the ¼ inch or smaller sized iron ore material output from HPGR crusher 24, and to subject it to microwave energy thereby causing the separation and breaking apart of particles of bound materials along their mineral boundaries. In one example, the rapid heating with microwave energy with microwave cracker 26 causes the breaking apart of particles of bound hematite/silica and magnetite/silica along their mineral boundaries, as is more fully discussed below.

The material output from microwave cracker 26 is fed to screen 28, which is included in recovery system 10 in one embodiment. In one embodiment, particles that are smaller than a certain size go through screen 28.

In one embodiment, recovery system 10 also includes sonic crusher 30, and particles that are larger than a certain size cannot go through screen 28 and are instead sent to sonic crusher 30.

In one example, particles larger than 1/16 inch cannot go through screen 28 and are sent to sonic crusher 30 to be reduced in size. In that example, particles that are under 1/16 inch in size go through screen 28. One skilled in the art understands that additional mesh screens can be used throughout system 10, and each can be of different sizes. Most screens are made of wires crossing at right angles to make square holes for passing material.

In one embodiment, sonic crusher 30 includes an elutriator and ultrasound energy, which are used to crush particles to a smaller size so they can proceed up and out of the elutriator, as will be more thoroughly discussed below. In one example, sonic crusher 30 is configured to crush the particles to a size under 1/16 inch.

In one embodiment, recovery system 10 also includes spiral classifier 32. In one example, elutriator overflow from sonic crusher 30 is sent to spiral classifier 32, to join the material that passed through screen 28. Overflow material that has been reduced in size from sonic crusher 30 and material that passed through screen 28 is sent to spiral classifier 32 so that it separates the material by using a slight centrifuge effect. Slurry is dumped into a trough that is shaped as a descending spiral of several complete turns. In one example, spiral classifier 32 has a four inch wide trough forming a spiral with a three foot outside diameter making eight turns dropping ten feet. As the slurry accelerates down the spiral, lighter particles move to the outside of the slurry stream, and dense particles stay to the inside. At the bottom of the spiral, a splitter separates the stream into two or more size fractions.

In one embodiment, spiral classifier 32 sorts material such that the lighter particles of the outside slurry stream are rejected as waste. In one example, this lighter rejected material is high in silica and low in iron. In one embodiment, the more dense particles on the inside of the slurry stream are retained for further processing. In one example, this stream of heavier material is mostly iron ore.

In one embodiment, recovery system 10 also includes balling drum 34, and the heavier material from spiral classifier 32 is sent to balling drum 34. In one example, the heavier material from spiral classifier 32 is iron ore, and it is combined with a binder (such as bentonite), a flux (such as limestone), and a reductant (such coal dust) and is dumped into balling drum 34. In balling drum 34, agglomeration of the contents forms balls or "green" pellets. These unprocessed pellets are not yet fired, reduced, or oxidized. In one embodiment, the pellets are about ½ inch in diameter.

In one embodiment, balling drum 34 is a large rotating cylinder drum placed at a slight incline. In one example, balling drum 34 is a 8 foot diameter, 24 foot long cylindrical drum. In the example, a wet mixture of iron ore, binder, reductant, water, and flux is dumped in the upper end of the drum. As material flows down the inside of the inclined, rotating drum, it tends to form small balls. In one case, this balling is assisted by a balling fork device that peels little starting pieces of ball material off the inside surface of the drum.

The balls then roll down the drum, growing in size as they collect more material, and then roll out of the drum. They can then be sized by a roller screen. Balls, sometimes referred to as green pellets before they are fired in a kiln or furnace, that are too small fall through the roller screen early and are sent back to travel through the drum again and get bigger. Properly sized balls fall through the roller screen where the rolls are spaced at the prescribed upper and lower limits for ball diameter and are sent to furnace 36. Oversize balls fall off the end of the roller screen and are mashed up and re-introduced to balling drum 34.

In one embodiment, recovery system 10 also includes pellet furnace 36 and the green pellets from balling drum 34 are placed into pellet furnace 36. In one embodiment, a layer of hearth material, such as crushed limestone in one example, is introduced into pellet furnace 36 along with the green pellets. The pellets on the hearth layer are heated to the point of metallization via microwave radiation and heat from a supplemental heat source such as a natural gas burner, as will be more thoroughly discussed below.

In one example, as the iron ore in the green pellets reduces, it forms molten pig iron which coalesces, and the molten silica and minor gangue minerals are forced to the outer surfaces of the pellets where they in turn coalesce to form clumps of slag. The hot pellets then come out of pellet furnace 36, in one embodiment, and are hit by a stream of cold water 38. The cold water spray 38 causes the slag to solidify and spall off of the iron pellet.

After cooling, the iron pellets, slag, and limestone are separated by separators 40, which in one example, includes magnetic separators, classifiers and similar separators. In one example, limestone is dried and recirculated back into pellet furnace 36 to serve as hearth layer material. The slag is rejected as waste. The iron nuggets can be further processed and sold as pig iron.

In some embodiments, recovery system 10 can include some ancillary screening, sizing, and recirculation circuits. For example, some additional screening can be used at the output of HPGR crusher 24 that will recirculate rocks larger than ¼ inch back through HPGR 24 to ensure that all material sent to microwave cracker 26 is indeed smaller than ¼ inch.

In addition, other embodiments may variously include screening and density classifiers, magnetic separators, or vacuum filters. In processing materials with recovery system 10, for example in some ore processing, additional classification can be used to separate out undesired materials by means of using physical properties such as size, shape, or density (specific gravity) of the minerals to perform that separation. In one example, screening classifiers can screen out materials that are of an inappropriate size or physical dimensions.

In one example, density classifiers are employed within system 10 to use differences in particle density to segregate differing minerals. Spiral classifier 32 described above is one example for separating silica from iron ores. Other similar classifiers can also be used.

In one example, magnetic separation classifiers are employed within system 10. In one embodiment, magnetic separation uses a magnetic roll separator. This magnetic roll separator is an axially rotating stainless steel drum submerged part-way into a tub of magnetic iron ore (magnetite) and water slurry. One segment of the drum's perimeter, under the slurry surface, is magnetized and pulls magnetite from the slurry and holds it tight against the drum surface as it rotates up out of the slurry. Once rotated several inches above the slurry surface, the magnetic field ends and a stream of water sprays across the face of the drum, thereby washing the magnetite particles into a trough, where they can be carried away for further processing.

In one example, vacuum filters are employed within system 10. In one embodiment, a vacuum filter, also sometimes called a snap filter, dips disks up to 12 feet in diameter composed of bags of filter fabric into a water/mineral slurry. Each bag is supported in a radial frame arrayed around a shaft. As the disk filters rotate in to and up out the slurry, vacuum is applied from inside the filter bags, pulling water out of the slurry and holding the mineral particles against the outside of the filter bag. The filter rotates further out of the slurry as water continues to be extracted from the stuck-on slurry until the vacuum stops and a blast of air is shot into the filter bags, popping the bags outward and snapping the minerals off the filter bag surfaces and onto a conveyor to be carried away for further processing.

In one embodiment, recovery system 10 is used to crush and/or separate ores within stockpile 20, such as Oolitic Iron ore, Ferruginous Chert (Silicified hematite/magnetite mix), Banded Iron Formation (Silicified hematite/magnetite mix), Cretaceous Pebbles (Silicified hematite/magnetite mix), Taconite (Magnetite, hematite, and $SiO_2$), Natural Iron Ore (hematite), Dunka Pit type (Fe sulfides, hematite, magnetite), and Gold bearing Quartz (Au, Ag in $SiO_2$ matrix).

In one embodiment, recovery system 10 is used to crush and/or separate minerals such as Bauxite (Al hydroxides), Kaolinite ($Al_2Si_2O_5(OH)_4$), Kyanite ($Al_2SiO_5$), Andalusite ($Al_2SiO_5$), Topaz ($Al_2SiO_4(F,OH)_2$), Sillimanite ($Al_2SiO_5$), Corundum ($Al_2O_3$), Orpiment ($As_2S_3$), Realgar (AsS), Barite ($BaSO_4$), Witherite ($BaCO_3$), Borax ($Na_2B_4O_5(OH)_{4-8}H_2O$), Tourmaline (B(Na—Ca—Al—Mg—Fe—Mn) silicate), Beryl ($Be_3Al_2(Si_6O_{18})$), Calcite ($CaCO_3$), Gypsum ($CaSO_4$-$2H_2O$), Dolomite ($CaMg(CO_3)_2$), Anhydrite ($CaSO_4$), Stilbite ($CaAl_2Si_7O_{18}$-$7H_2O$), Aragonite ($CaCO_3$), Apatite ($Ca_5(PO_4)_3(F, Cl, OH)$), Epidote ($Ca_2(Al,Fe)Al_2O(SiO_4)$—$(Si_2O_7)(OH)$), Malachite ($Cu_2CO_3(OH)_2$), Chrysocolla ($Cu_4H_4Si_4O_{10}(OH)_8$), Bornite ($Cu_5FeS_4$), Chalcopyrite ($CuFeS_2$), Pyrrhotite ($Fe_{1-x}S$), Magnetite ($Fe_3O_4$), Hematite ($Fe_2O_3$), Arsenopyrite (FeAsS), Siderite ($FeCO_3$), Chromite ($FeCr_2O_4$), Pyrite ($FeS_2$), Marcasite ($FeS_2$), Ilmenite ($FeTiO_3$), Wolframite ($(Fe,Mn)WO_4$), Goethite (aFeO(OH)), Limonite (Fe—OH $nH_2O$), Staurolite ($Fe_2A_{19}O_6(SiO_4)_4$—$(O,OH)_2$), Cinnabar (HgS), Muscovite (KAl hydrated silicate), Biotite (KMg hydrated silicate), Talc (Mg hydrate), Chlorite (MgFe hydrate), Serpentine ($Mg_3Si_2O_5(OH)_4$), Magnesite ($MgCO_3$), Spinel ($MgAl_2O_4$), Manganite (MnO(OH)), Pyrolusite ($MnO_2$), Molybdenite ($MoS_2$), Halite (NaCl), Natrolite ($Na_2Al_2Si_3O_{10}2H_2O$), Galena (PbS), Anglesite ($PbSO_4$), Cerussite ($PbCO_3$), Stibnite ($Sb_2S_3$), Quartz ($SiO_2$), Opal ($SiO_2$-$nH_2O$), Cassiterite ($SnO_2$), Celestite ($SrSO_4$), Strontianite ($SrCO_3$), Rutile ($TiO_2$), Sphalerite (ZnS), Hemimorphite ($Zn_4(Si_2O_7)(OH)_2$—$H_2O$), Smithsonite ($ZnCO_3$), and Zircon ($ZrSiO_4$).

In one embodiment, recovery system 10 is used to crush and/or separate igneous rock within stockpile 20, such as granite, gabbro, basalt; sedimentary rock such as conglomerate, sandstone, shale, limestone, iron formation; metamorphic rock such as slate, marble, gneiss, quartzite; and various other rocks.

In one embodiment, recovery system 10 is configured as a portable system. In one example, each of the components of system 10 is configured compact enough to be carried on rail cars, such as one or more cars of a train. In one example, each of grizzly 22, HPGR crusher 24, microwave cracker 26, screen 28, sonic crusher 30, spiral classifier 32, balling drum 34, pellet furnace 36 and separator 40 are configured on a rail car, or series of cars, such that recovery system 10 can be rolled over a rail directly to a waste stockpile for processing thereof.

Figure 2:
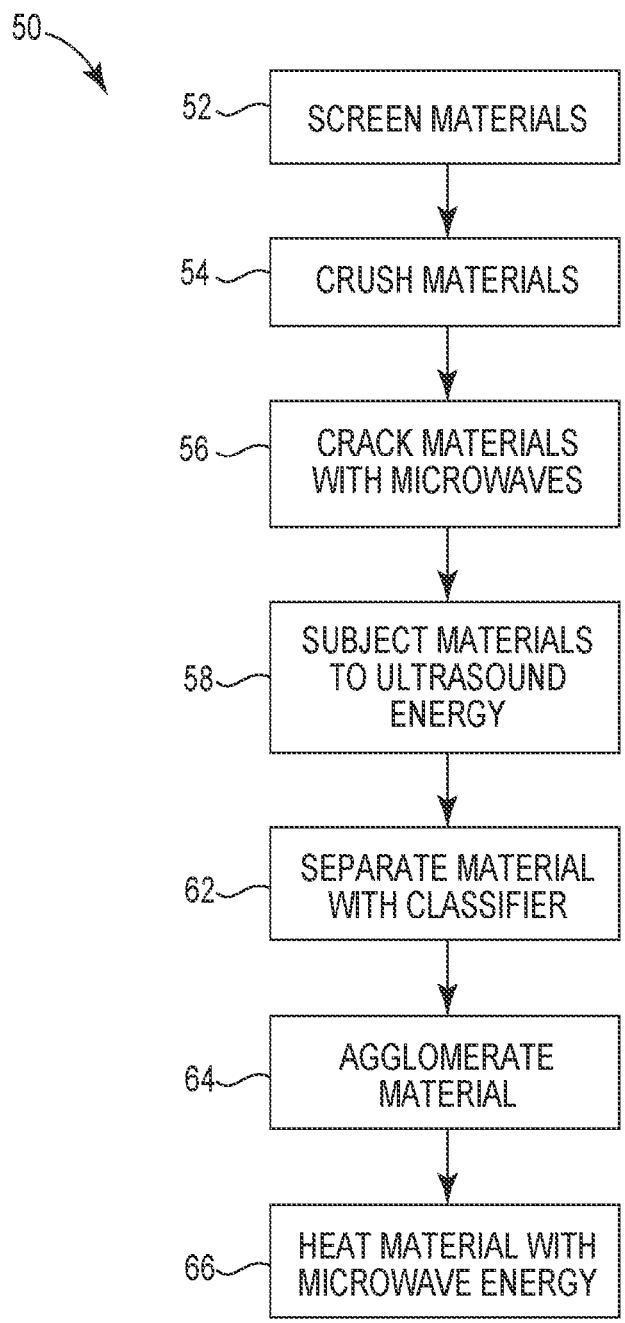
FIG. 2 is a flow diagram illustrating a process of recovering minerals using microwave and ultrasound energy in accordance with one embodiment.

FIG. 2 is flow diagram illustrating a mineral recovery process 50 in accordance with one embodiment. In one embodiment, process 50 is used to treat and recover materials from waste stockpiles in order to recover certain usable minerals. In one example, the waste stockpiles are from an abandoned iron ore mine such as waste material found in the Iron Range of Northern Minnesota.

At step 52, material from the waste stockpile is screened. In one example, it is passed through 3 inch mesh screen. Any materials that are larger than 3 inches will be rejected and the materials smaller than 3 inches are processed with the remaining steps. In one example, material from the waste stockpile is also passed through a grizzly, such as grizzly 22 described above. In one case, screening with the grizzly is a first step in sorting material, and may serve to keep boulders and trash from clogging or damaging other processing elements. In one example, any oversized material is typically low in iron content, high in silica, and is therefore rejected and discarded. In one example, any material that is larger than one and one half inches is discarded.

Next, at step 54, remaining processed materials are crushed. In one example, the materials are crushed with a device such as HPGR crusher 24 described above. In one example, the materials are subjected to a high pressure grinding roll that uses two parallel rollers to crush rock passing between the rollers. The rolls are set at a given spacing and held at that spacing by large hydraulic rams while the rolls are given a rotary motion inward and downward by electric motors, pulling rock between the rolls and crushing it until it passes through the set gap. In one embodiment, material is set to be crushed down to ¼ inch. In one example, only iron ore that is ground until ¼ inch size is sent on for further processing.

At step 56, the processed material is then subjected to microwave energy, thereby causing the separation and breaking apart of particles of bound materials along their mineral boundaries. In one example, the rapid heating with microwave energy causes the breaking apart of particles of bound hematite/silica and magnetite/silica along their mineral boundaries.

At step 58, after the processed material has been broken apart with microwave energy, it is then sent through an elutriator and subjected to ultrasound energy. The elutriator helps focus the ultrasound energy onto the larger particles of the processed material thereby crushing particles to a smaller size so they can proceed up and out of the elutriator. In one example, particles of the processed material are crushed to a size under 1/16 inch with the ultrasound energy.

At step 62, processed material is then separated. In one example, the material is separated with a classifier, such as spiral classifier 32 described above. In one embodiment, the processed material is separated using a slight centrifuge effect. The processed material is carried in a slurry that is dumped into a trough shaped as a descending spiral of several complete turns. As the slurry accelerates down the spiral, lighter particles move to the outside of the slurry stream, and dense particles stay to the inside. At the bottom of the spiral, a splitter separates the stream into two or more size fractions.

In one embodiment, processed material is sorted such that the lighter particles of the outside slurry stream are rejected as waste. In one example, this lighter rejected material is high in silica and low in iron. In one embodiment, the more dense particles on the inside are retained for further processing. In one example, this stream of heavier material is mostly iron ore.

At step 64, the heavier processed material is then agglomerated. In one example, the heavier material is iron ore, and it is combined with a binder (such as bentonite), a flux (such as limestone), and a reductant (such coal dust) and is formed into a ball. In one example, this balling is accomplished with a drum, such as balling drum 34 described above. The agglomeration of these materials in one case forms balls or "green pellets." In one embodiment, the pellets are about ½ inch in diameter.

At step 66, the balls or green pellets are heated in a furnace, such as pellet furnace 36 described above. In one embodiment, a layer of hearth material, such as crushed limestone in one example, is laid down and the green pellets are placed on it. The pellets on the hearth layer are then heated to the point of metallization via microwave radiation and heat from a supplemental heat source such as a natural gas burner.

In one example, as the iron ore in the green pellets reduces, it forms molten pig iron which coalesces, and the molten silica and minor gangue minerals are forced to the outer surfaces of the pellets where they in turn coalesce to form clumps of slag. The hot pellets are then hit by a stream of cold water. The cold water spray causes the slag to solidify and spall off of the iron pellet.

After cooling, the iron pellets, slag, and limestone are separated. In one example, limestone is dried and recirculated to serve as hearth layer material. The slag is rejected as waste. The iron nuggets can be further processed and sold as pig iron.

Figure 3:
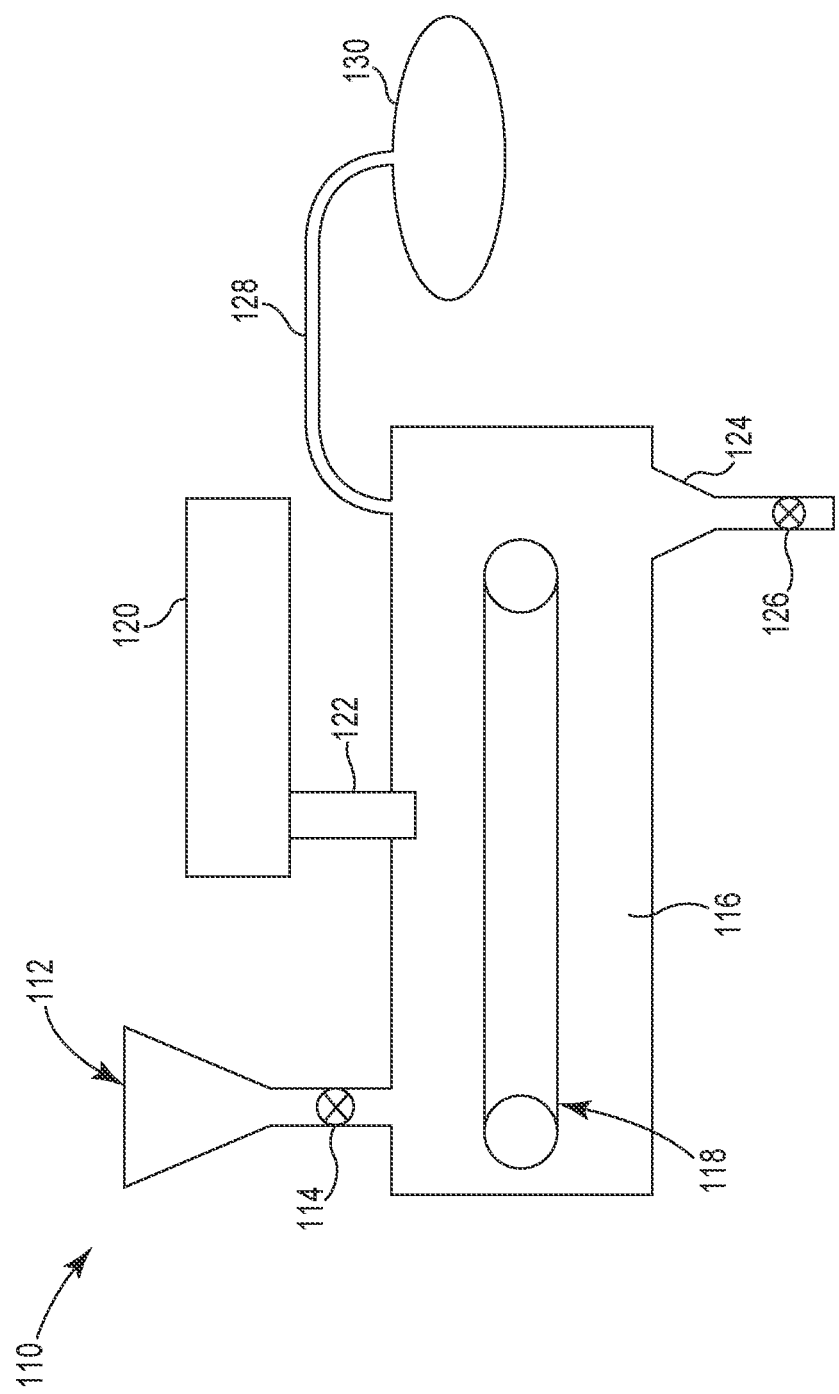
FIG. 3 illustrates a length-wise cross-sectional view of a silica cracking microwave oven in accordance with one embodiment.

FIG. 3 illustrates a microwave oven 110 in accordance with one embodiment. In one embodiment microwave oven 110 is used as microwave cracker 26 in the above recovery system 10. In one exemplary embodiment, microwave oven 110 is used for "silica cracking" or for the separation of iron ore composed of silica and magnetite. In one embodiment, microwave oven 110 includes an entry gate 112, entry valve 114, main vessel 116, conveyer 118, microwave source 120, waveguide 122, exit gate 124, exit valve 126, exhaust pipe 128 and recovery system 130.

In one embodiment, materials such as those from a waste stockpile 20 in the above system 10, are particles composed of two or more joined materials aggregated together. In some examples, these materials have different rates of microwave energy absorption, and are exposed to microwaves in a microwave oven 110. The materially distinct components of the particle will absorb more or less microwave energy than adjacent material(s) in the particle, and will physically expand at different rates as they are heated. Differential thermal expansion will cause physical separation at the common surfaces of the differing materials, allowing subsequent complete separation.

In areas where complete separation of materials does not occur, or in more homogeneous materials, differential heating will still take place, and if it does not cause complete breakage of the particle, it will often cause stress cracking and microcracking which enables later breakage of the particle by other means.

Differential thermal expansion can be assisted by cooling particles prior to heating, or by subjecting the heated particles to additional thermal shock e.g. by dumping into cold water.

In one embodiment, microwave oven 110 is configured to separate quartz from iron ore in pieces of waste rock that contain both materials. In one case, microwave oven 110 is configured to cause the decrepitation of iron ore and bonded minerals like quartz. In a process using microwave oven 110, not only is the iron ore separated from the quartz, but some of the differential thermal expansion, which results in breaking apart the quartz and iron ore, also creates fractures and microfractures in the iron ore that eases crushing and grinding of the ore in later processing.

In one embodiment, feed materials such as waste rock composed of iron ore and quartz are introduced to microwave oven 110 at entry gate 112. Entry valve 114 is then actuated to controllably allow the minerals into main vessel 116 of oven 110. In one embodiment, vessel 116 of microwave oven 110 is enclosed in order to control the atmosphere inside the operating vessel 116. For example, in one embodiment, operating vessel 116 is a stainless steel vessel that is sealed sufficiently to prevent microwave radiation leakage. It is further configured to contain dust, gases, and vapors produced during processing.

In one embodiment, entry gate 112 is oriented such that feed materials are deposited from gate 112 onto conveyor 118 within vessel 116. Conveyer 118 then conveys feed materials from a first location adjacent entry gate 112 such that they pass under waveguide 122. Waveguide 122 is coupled to microwave source 120 such that microwaves from source 120 are directed via waveguide 122 at the feed materials on conveyer 118 as they pass underneath.

In one embodiment, the directed microwaves sufficiently heat the feed materials such that separation is induced between the silica and magnetite ore fractions. The fractured material is dumped from conveyor 118 into exit gate 124, where it can be controllably removed via exit valve 126 for further processing. Vapors and gases that are generated by the process are removed via exhaust pipe 128 and treated by recovery system 130. Recovery system 130 is configured to control emissions from the processing of feed materials within oven 110.

In one embodiment, the atmosphere inside vessel 116 is controlled in conjunction with the process of heating the feed materials with microwave energy. For example, in one embodiment where processing of relatively inert, nonreactive, and nonhazardous material is done, vessel 116 is controlled such that the pressure within the vessel is at atmospheric pressure. To control emissions where processed materials would react with the ambient atmosphere to create noxious emissions (for example, $SO_x$ from sulfide ores) the vessel 116 may be given an inert atmosphere or run under vacuum, and emissions treated by recovery system 130. In yet another embodiment, a pressurized environment is induced within vessel 116 to control the internal atmosphere and exclude ambient air from entering vessel 116. In another embodiment, an oxidizing atmosphere is induced within vessel 116, for example, to oxidize minerals containing sulphur, such as pyrite ($FeS_2$), and remove the resultant $SO_2$ with recovery system 130. In another embodiment, a reducing atmosphere or an inert atmosphere is induced within vessel 116, for example, to prevent the oxidation of sulphur in pyrite as it is heated and exposed to the interior atmosphere during processing. In another embodiment vessel 116 is pressurized to increase the efficiency of ultrasound energy used to assist in fracturing feed materials.

Figure 4:
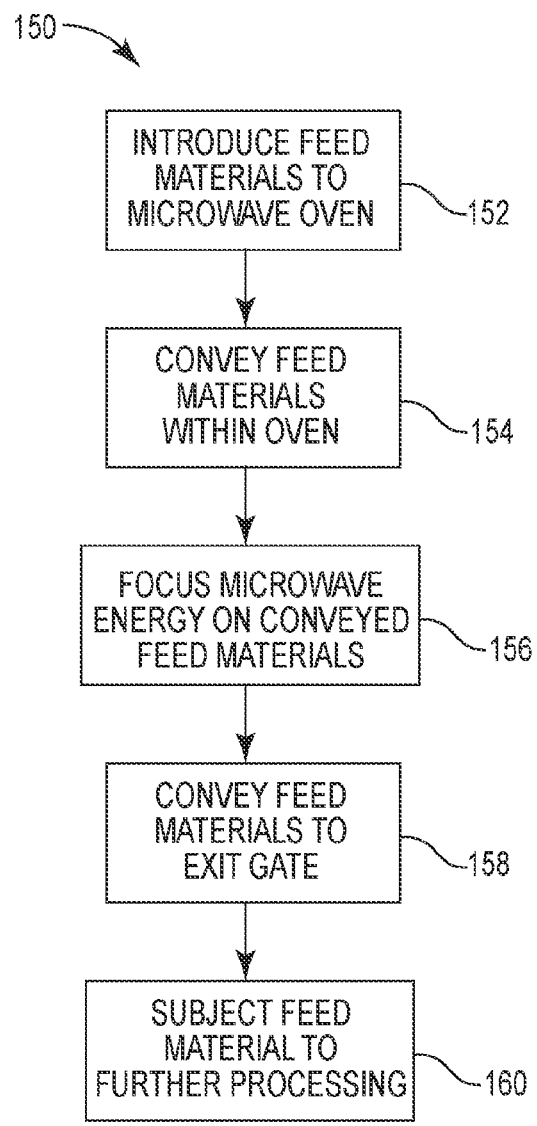
FIG. 4 is a flow diagram illustrating a silica cracking process in accordance with one embodiment.

FIG. 4 is a flow diagram illustrating a mineral treatment process 150 in accordance with one embodiment. In process 150, feed materials are introduced to an oven, such as microwave oven 110 or microwave cracker 26 above, via a hopper and gate at step 152. Once inside the oven, the feed materials are conveyed on a conveyor, such as conveyer 118 above, at step 154. The feed materials are then moved past a waveguide that focuses microwave energy onto the feed materials at step 156.

In one embodiment, the microwaves are generated from a magnetron, such as magnetron 120 above, and then focused at the feed materials via a waveguide. As the feed materials are moved past the waveguide, they absorb the focused microwaves and heat up. In one embodiment, the feed materials include iron ore components joined to quartz components. In that example, the iron ore component of the feed absorbs the majority of the microwaves and heats rapidly. The quartz absorbs much less microwave energy. The iron ore expands much more than the quartz and breaks free where the two materials are joined.

In one embodiment, the microwaves are generated from a magnetron, such as magnetron 120. In one embodiment, microwaves generated from magnetron 120 are in the range from 300 megahertz to 300,000 megahertz.

In one embodiment, magnetron 120 is controlled to induce thermal runaway in the feed materials within vessel 116. In one case, thermal runaway arises when the power dissipation in small elemental volumes within the feed material particles exceeds the rate of heat transmission to its surroundings, so that the rate of increase of enthalpy is greater than its surroundings. The temperature increases at a faster rate in the feed materials than in the surroundings.

Often, there is arcing created in the feed materials when thermal runaway is induced. Despite the arcing created in the materials, which is typically not a desired effect, the induced thermal runaway causes rapid heating in the feed materials, thereby breaking and micro-fracturing the feed material particles due to differential thermal expansion.

At step 158 the microwave-treated materials are then dropped from the conveyor into an exit gate for removal from the oven. In one embodiment, at a step 160 the microwave-treated materials are removed for further processing. In one embodiment, iron ore that is treated by process 150, and steps 152-158, is largely freed from its original quartz fraction. In addition, process 150 also produces internal fractures and micro-cracking in the iron ore that reduces the energy needed to crush or grind the ore in later processing.

As such, in some embodiments, the quartz is more violently detached from the iron ore by further processing 160, such as dropping the microwave-treated iron ore into cold water, causing more complete separation of the material, as will be further described below. In other embodiments, further processing 160 includes subjecting the microwave-treated iron ore to thermal shock or ultrasound energy to cause further separation, as will be further described. In some embodiments, ultrasound energy can be generated within vessel 116 such that after, or even simultaneously with, the microwave heating, the feed materials are then subjected to ultrasound energy. In one example, the ultrasound energy is in the frequency range of 16,000 hertz and higher.

In accordance with embodiments, feed materials can be introduced to a microwave oven such as oven 110. Feed materials introduced into the zone of microwave energy are stressed so as to facilitate separation into constituent parts and/or be reduced in size. The exposure to microwave energy is made sufficient to cause differential thermal expansion (e.g. mm per m per degree C, or cc per L per degree C) among differing materials within individual particles, grains, or pieces of the material being treated. The differential thermal expansion is intended to cause physical failure throughout the particle, grain, or piece being treated.

Microwave oven 110 creates differential thermal expansion in the feed materials via heating with microwaves. In one embodiment, differential thermal expansion is achieved by ensuring the two or more differing materials making up the feed materials or treated particle, grain, or piece have sufficiently different rates of microwave energy absorption, such that one material is transparent to microwave energy relative to the adjacent material. Such materials will absorb microwave energy at different rates, resulting in respectively different rates of heating and expansion.

In another embodiment, adjacent materials of differing composition may absorb the same quantities of microwave energy, but their coefficients of thermal expansion are sufficiently different that each material expands at significantly different rates, though their internal temperatures during and after exposure to the microwaves may be similar.

In other embodiments, feed materials can have both different rates of microwave energy absorption and different rates of thermal expansion. In the embodiments, a great enough difference in physical expansion of adjacent materials is created to overcome the chemical, atomic, or physical forces binding them together, causing physical failure.

In some embodiments, the physical failure will be so complete as to cause separation of the differing constituent materials within the particle, grain, or piece, one from another. In some cases physical failure will result in breakage of the particle, grain, or piece into smaller particles, grains, or pieces of composition similar to the parent particles, grains, or pieces. In some cases physical failure will occur as fracturing or micro-fracturing of the particle, grain, or piece. In some cases physical failure will occur in combinations of the preceding described modes. In some cases, the microwave energy causes dissolution, decrepitation, or disintegration of one or more of the constituent materials of the feed materials.

If the objective is to separate differing materials found within single particles, grains, or pieces, such as quartz bound to magnetite, the two materials can be made to split apart entirely, into particles, grains, or pieces composed or entirely or predominantly of one material (e.g. quartz) or the other (e.g. magnetite).

If the objective is to reduce particles, grains, or pieces in size, such as with a relatively homogenous iron ore composed of hematite and magnetite, even though the particles, grains, or pieces may not separate completely into separate components of hematite and magnetite, internal stresses caused by differential thermal expansion will cause either complete fracture, resulting in smaller particles, grains, or pieces; or, though the particles, grains, or pieces remain unbroken, differential thermal expansion will induce fractures and microfractures that will reduce the energy required for further size reduction via more traditional means.

Figure 5:
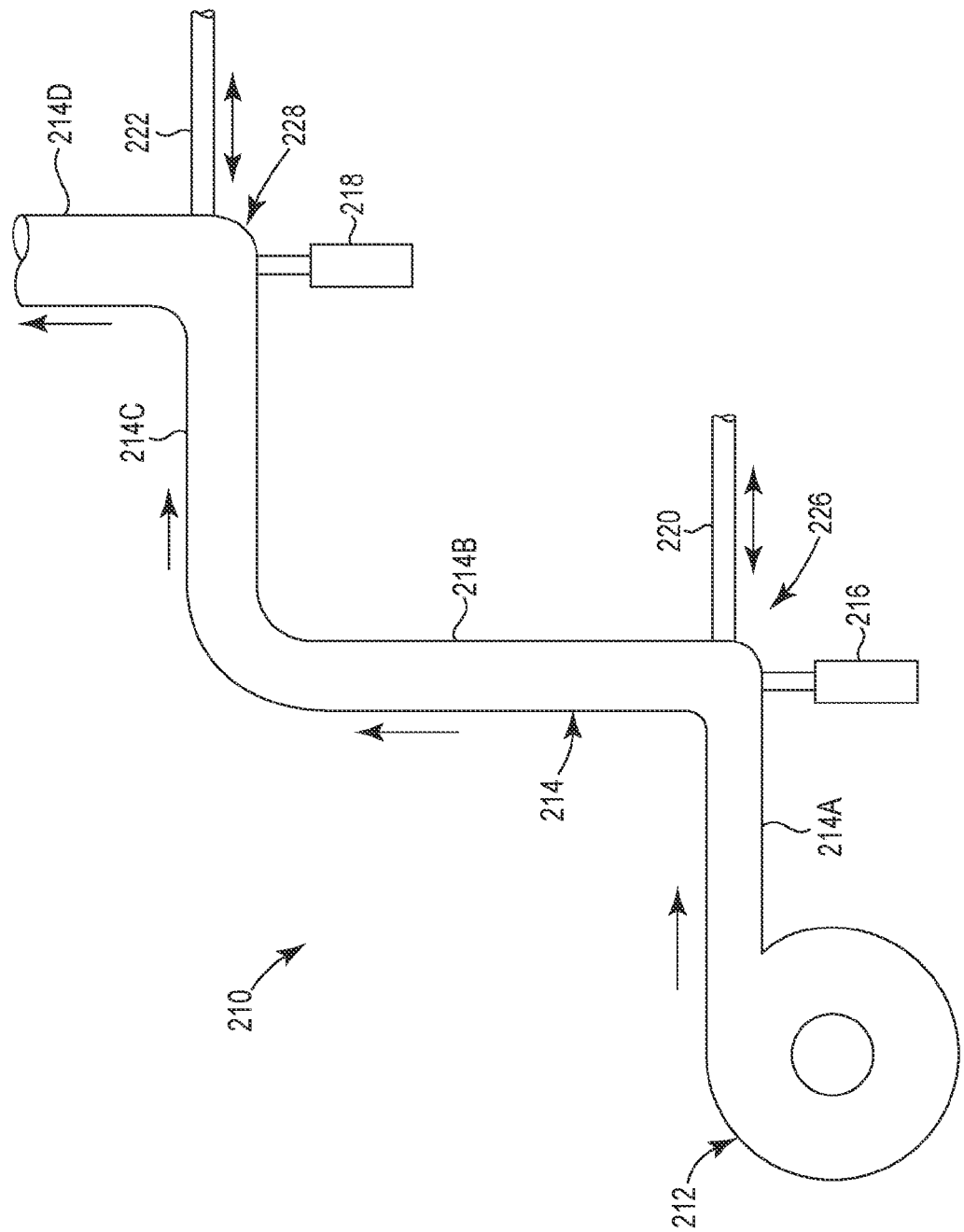
FIG. 5 illustrates a length-wise cross-sectional view of an ultrasonic crusher in accordance with one embodiment.

FIG. 5 is an ultrasonic crusher 210 in accordance with one embodiment. In one embodiment ultrasonic crusher 210 is used as sonic crusher 30 in the above recovery system 10. In one exemplary embodiment, ultrasonic crusher 210 is used to sort and size iron ore and remove gangue. In another example, ultrasonic crusher 210 separates and removes silica components from an iron ore. In one embodiment, ultrasonic crusher 210 includes pump 212, pipe system 214, first and second ultrasound sonotrodes 216 and 218, and first and second supplemental pipes 220 and 222.

In one embodiment, ultrasonic crusher 210 is used to sort materials so that certain components can be removed. In one example, minerals such as iron ore mixed with gangue are sorted such that the gangue is removed. Iron ore is introduced into ultrasonic crusher 210 as a water-borne slurry through pump 212. Pump 212 forces the ore and gangue mixture into a first pipe segment 214A of pipe system 214 toward a first elbow section 226.

In one embodiment, first pipe segment 214A is substantially horizontally oriented toward first elbow section 226. Pipe 214 has a first diameter in first pipe segment 214A. In one embodiment, the first diameter is configured such that the cross-sectional area in first pipe segment 214A is approximately 960 mm$^2$. The slurry moves through first pipe segment 214A toward first elbow section 226 in the direction marked with the adjacent arrow in FIG. 5. In one case, the slurry moves out of first elbow section 226 into second pipe segment 214B of pipe system 214. In one example, second pipe segment 214B is substantially vertically oriented.

In one embodiment, pump 212 forcing the slurry through the combination of first pipe segment 214A, first elbow section 226 and into second pipe segment 214B, sets up a first stage elutriator, such that lighter particles are separated from heavier ones using the substantially vertically-directed stream of liquid in second pipe segment 214B. In one example, separation of particles occurs by allowing particles to settle in a fluid. As such, in one embodiment, the coarser, heavier, and rounder grains settle faster than the finer, lighter, and more angular grains. The fluid is in motion, carrying away the slow-settling grains, while a sediment of fast-settling grains is developed.

In one embodiment, first ultrasound sonotrode 216 is configured adjacent first elbow section 226. In one embodiment, sonotrode 216 is configured with 1,000 watts and 20 kHz. As the slurry moves upward from first elbow section 226 and first sonotrode 216, the first stage of elutriation takes place as the slurry enters second pipe segment 214B. In one embodiment, second pipe segment 214B has a second diameter. In one embodiment, the second diameter is configured such that the cross-sectional area in second pipe segment 214B is approximately 1,260 mm$^2$, or approximately 1.3 times as large as the cross-section of first pipe segment 214A. In one case, the cross-sectional area of second pipe segment 214B is sized to permit the largest and densest particles in the slurry to settle down to first elbow section 226, which houses first sonotrode 216. Particles of lesser size and density will continue upward through second pipe segment 214B in the direction indicated by the adjacent arrow in FIG. 5.

At first elbow section 226 where first sonotrode 216 is installed, particles that are too large and/or too dense to move upward through second pipe segment 214B, fall back to first elbow section 226 above first sonotrode 216. In one embodiment, this settled or sediment material is milled, crushed, and ground by ultrasound energy generated by first sonotrode 216 until the particles are small enough to move upward with the bulk of the slurry.

In one embodiment, first supplemental pipe 220 is used to draw off or to add slurry components to modify slurry properties in pipe system 214, and to allow sampling of the slurry materials. Ore particles in the slurry that are of the desired density and size can be removed or added, and fluids, or reagents, can also be introduced to the system to adjust the slurry chemistry, density, and rate of particle settling.

In one embodiment, slurry from second pipe segment 214B moves into third pipe segment 214C. In one example, third pipe segment 214C is substantially horizontally oriented toward second elbow section 228. Pipe 214 has a third diameter in third pipe segment 214C. In one embodiment, the third diameter is configured such that the cross-sectional area in third pipe segment 214C is approximately 1,260 mm$^2$, or approximately the same as the cross-section of second pipe segment 214B. The slurry moves through third pipe segment 214C toward second elbow section 228 in the direction marked with the adjacent arrow in FIG. 5. In one case, the slurry moves out of second elbow section 228 into fourth pipe segment 214D of pipe system 214. In one example, fourth pipe segment 214D is substantially vertically oriented.

In one embodiment, pump 212 forcing the slurry through the combination of third pipe segment 214C, second elbow section 228, and into fourth pipe segment 214D, sets up a second stage elutriator, which very similarly to the first stage elutriator, allows lighter particles to be separated from heavier ones using the substantially vertically-directed stream of liquid in fourth pipe segment 214D.

In one embodiment, second ultrasound sonotrode 218 is configured adjacent second elbow section 228. In one embodiment, second sonotrode 218 is configured with 1,000 watts and 20 kHz. As the slurry moves upward from second elbow section 228 and second sonotrode 218, the second stage of elutriation takes place as the slurry enters fourth pipe segment 214D. In one embodiment, fourth pipe segment 214D has a fourth diameter. In one embodiment, the fourth diameter is configured such that the cross-sectional area in fourth pipe segment 214D is approximately 1,590 mm$^2$, or approximately 1.6 times as large as the cross-section of first pipe segment 214A. In one case, the cross-sectional area of fourth pipe segment 214D is sized to permit the largest and densest particles in the slurry to settle down to second elbow section 228, which houses second sonotrode 218. Particles of lesser size and density will continue upward through fourth pipe segment 214D in the direction indicated by the adjacent arrow in FIG. 5.

As was the case at the first stage elutriator, at second elbow section 228 where second sonotrode 218 is installed, particles that are too large or too dense to move upward through fourth pipe segment 214D, fall back to second elbow section 228 above second sonotrode 218. In one embodiment, this settled or sediment material is milled, crushed, and ground by ultrasound energy generated by second sonotrode 218 until the particles are small enough to move upward with the bulk of the slurry.

In one embodiment, second supplemental pipe 222 is used to draw off or to add slurry components to modify slurry properties in pipe system 214, and to allow sampling of the slurry materials. Ore particles that are of the desired density and size can be removed or added and fluids, or reagents, can also be introduced to the system to adjust the slurry chemistry, density, and rate of particle settling.

One skilled in the art will observe that additional stages of elutriation can be added with combinations of pipe segments and elbow sections, along with adjacent sonotrodes, such that further sorting and separation occurs. Additionally, adjacent supplemental pipes can be used to add and remove material at the stages.

Mechanical characteristics, such as elutriator tube cross-sectional area, shape, and length can be varied as required and along with slurry properties such as flow rate, slurry density, and fluid chemistry controlled in the initial slurry composition and/or via the supplemental pipes, such as 220 and 222 illustrated, act in concert with the ultrasound energy to produce the desired separations of ores and wastes.

In one embodiment, ultrasonic crusher 210 is used to separate particles on the order of −20 to +300 mesh (833 to 50 microns). In one embodiment, larger sizes are sorted when heavy media is introduced, or when extreme hindered settling conditions are produced.

In one embodiment, dilution of the slurry in ultrasonic crusher 210 is 3%-35% solids by weight (finer particles to coarser particles). Sorting is done at as high a fluid density as possible, typically 40%-70% solids by weight.

Figure 6:
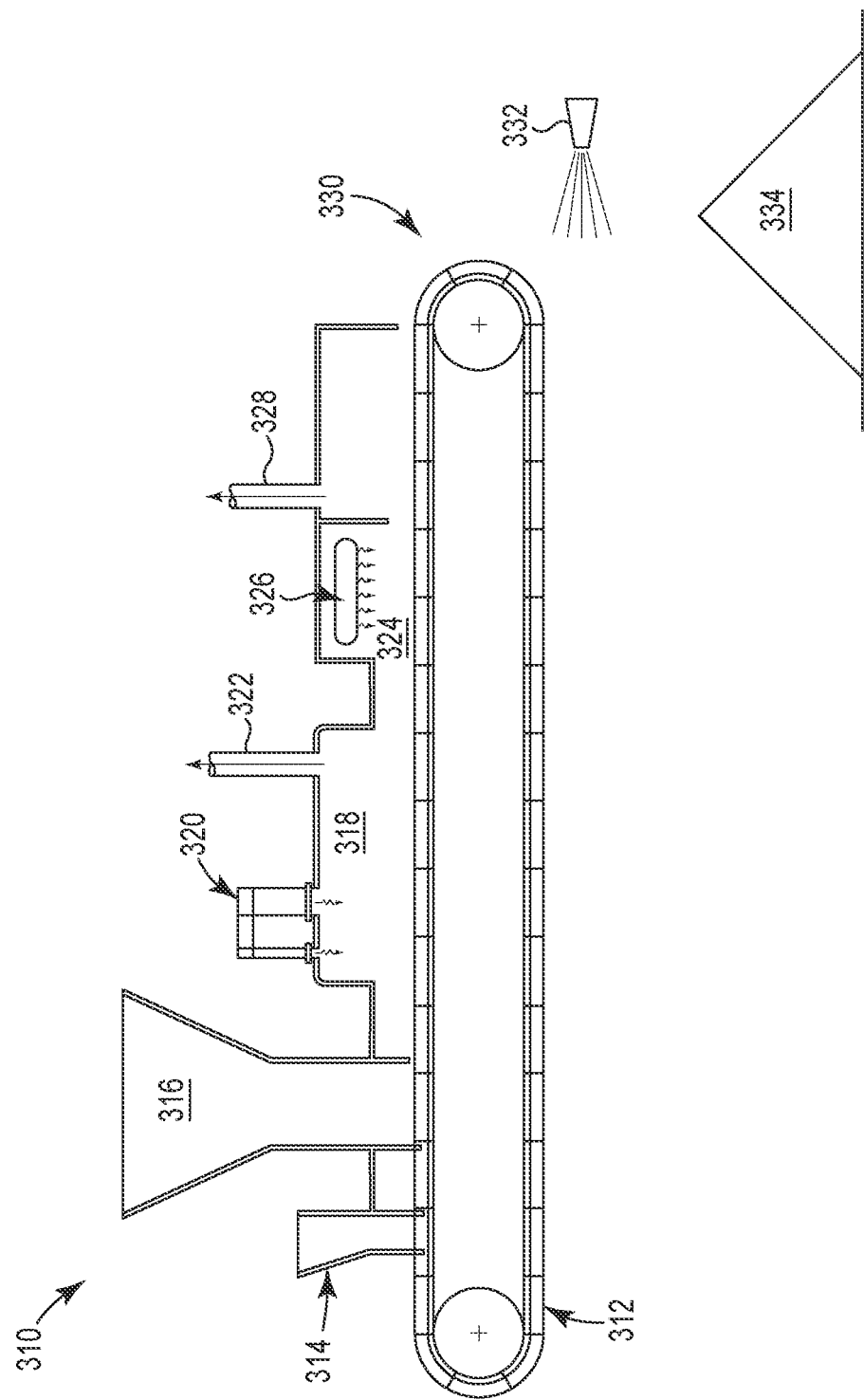
FIG. 6 illustrates a microwave furnace for reducing metal ore pellets in accordance with one embodiment.

FIG. 6 illustrates microwave pellet furnace 310 in accordance with one embodiment. In one embodiment microwave pellet furnace 310 is used as pellet furnace 36 in the above recovery system 10. In one embodiment, furnace 310 includes a conveyor configured to transport metal-containing material through a microwave furnace equipped with an auxiliary radiant heat source for treating, reducing, or oxidizing minerals.

In one embodiment, furnace 310 includes conveyor 312. Conveyer 312 is configured to transport metal-containing material through a microwave heating zone 318 and a direct heat zone 324 to a drop zone 330. Microwave generators 320 are located in microwave zone 318 and a direct heat source 326 is located in the direct heat zone 324. Microwave zone 318 includes microwave zone vent 322, and direct heat zone 324 includes direct heat zone vent 328

In one embodiment, conveyor 312 within furnace 310 is a horizontal in-line conveyor for transporting metal-containing material introduced to furnace 310. In one embodiment, conveyor 312 is made of high-temperature resistant, microwave transparent material, such as Kevlar, and it is configured to transport metal-containing material throughout the process. In one embodiment, furnace 310 is configured with a rotary hearth, rather than horizontal conveyor, for transporting material through the heating zones.

In one example, a first material layer on conveyor 312 is an insulating and relatively microwave transparent material. In one embodiment, the first material layer is introduced on conveyer 312 via first material feed 314 to form a hearth layer. This first material layer protects conveyor 312 from the heat of a nugget-forming process and aids further in the reduction process, as will be described further below.

In one embodiment, the first layer of material is introduced onto conveyor 312 via first material feed 314 and a second layer of material is introduced onto conveyor 312 via second material feed 316. In one embodiment, the second layer of material includes a metal-containing material. Conveyer 312 then conveys the first and second layers of materials through microwave heating zone 318 and then through direct heat zone 324, where they are heated to at least the melting temperature of one of the metals in the metal-containing material. The materials are then conveyed to drop zone 330 and cold water spray 332 is configured to hit the materials as they come off conveyor 312. The materials then fall to material discharge 334 for subsequent processing.

In one embodiment, furnace 310 is used in the reduction of iron ore to metallic iron. In one embodiment, the first material layer includes crushed limestone that is introduced at first material feed 314. The crushed limestone creates a hearth bed layer on conveyor 312.

In one embodiment, iron ore is mixed and combined with a fluxing agent, a reducing agent, and a binder in order to produce an unfired pellet or briquette. In one embodiment, the second material layer includes this unfired iron ore pellet, which is introduced into the furnace 310 at second material feed 316 as an iron ore pellet layer. The iron ore pellet layer is in one case introduced over the limestone hearth bed layer on conveyor 312. In one example, the iron ore pellet layer is composed of unfired (green) iron ore pellets. The pellets are transported on the hearth layer by conveyer 312.

In one embodiment, crushed limestone insulates the conveyor 312 from the heat of the reducing/melting iron ore pellets and from the heat of direct heat source 326. The crushed limestone hearth bed also keeps the iron ore pellets from sticking to the conveyer 312 as they are processed and discharged. In one embodiment, the limestone will also have a minor role as additional fluxing agent for the iron ore pellets in the heating process. Some limestone ($CaCO_3$) may decompose and provide a small amount of CO as a reducing gas.

In one embodiment, the iron ore pellets are heated with microwave radiation from microwave generators 320 in microwave heating zone 318, and then with additional heat from heat sources 326 at direct heat zone 324 until the iron ore pellets are reduced to crude pig iron and slag. In one example, the iron ore to be reduced is taconite ore composed of hematite and magnetite. In one example, the fluxing agent is limestone, the reducing agent is coal, and the binder is bentonite. In one example, the iron ore pellet is heated until the pellet is reduced to greater than 92% metallization.

Conveyer 312 transports the iron ore pellets on the limestone hearth layer into microwave heating zone 318 and under microwave generators 320. While in microwave heating zone 318, the iron ore is heated, via microwave absorption, sufficiently to begin reduction and metallization. As the iron ore in the pellet is reduced, the metallic iron consolidates at the bottom of the pellet. Also as the pellet is reduced, gangue minerals in the pellet, such as silica, are forced to the surface of the pellet, forming a slag. The limestone hearth layer also aids in containing the ore, binder, reductant, flux, and resulting molten iron and slag as the pellet is heated and reduced.

In some examples, the iron ore has not been fully reduced after passing through microwave zone 318, or in some instances, additional heat is needed to complete the consolidation of metallic iron and separation of slag. In such cases, more heat is added in direct heat zone 324. In one embodiment, additional heat is provided by heat source 326, which in one example is a natural gas burner. The efficiency of microwave energy absorption of most materials, including iron ores, changes as these materials heat up. The use of supplemental heat from a non-microwave source, such as heat source 326, extends the reduction and melting time for the iron ore pellets, while allowing high volumes of iron ore pellets to pass through the microwave heating zone 318. In one embodiment, most of the heating of the iron ore pellets will occur in the microwave heating zone 318, but providing the supplemental heat from heat source 326 reduces problems with excessive "thermal runaway," a sometimes destructive and problematic phenomenon associated with microwave heating.

In some embodiments, some of the materials in the iron ore pellets introduced into furnace 310 are relatively transparent to microwaves. As such, in one example, microwave generators 320 in microwave heating zone 318 are used to heat one or more of the materials in the iron ore pellets, for example magnetite ($Fe_2O_3$), to its melting point. Then, the heat source 326 in direct heat zone 324 is used to bring the microwave transparent materials in the pellet, for example silica ($SiO_2$), to their respective melting points.

In some embodiments, heat source 326 in direct heat zone 324 may be needed due to varied efficiency of microwave absorption of differing minerals at differing temperatures and of the same mineral with differing crystalline structures (for example, hematite, $Fe_2O_3$, occurs with several different crystal structures: earthy, micaceous, hexagonal, rhombohedral, botryoidal, polysynthetically twinned, etc.). In one example, after microwave heating zone 318, heat source 326 in direct heat zone 324 provides additional heat to the pellets to complete metallization and slag formation. In another example, a heat source may be used before microwave heating zone 318 in order to increase the mineral's ability to absorb microwave radiation. Some minerals more readily absorb microwave energy when heated well above room temperature. In some examples, it may also be required to dry or thaw wet or frozen material.

Once the iron ore is sufficiently reduced and metallized, the materials from conveyer 312 are dropped at drop zone 330. A cold water spray 332 is configured to contact the metalized, slag-covered pellets as they come off conveyor 312. Cold water spray 332 cools the discharged pellets rapidly, causing the brittle cooled slag to fracture and violently separate (or "spall") from the more ductile cooled iron as it falls to material discharge 334. Subsequent processing cleans the iron pellets and removes the slag fragments and the hearth layer limestone. In one example, subsequent mineral processes such as screens or separators are used and will include recycling of the limestone for a hearth layer.

In one alternative embodiment, furnace 310 is used in the roasting of certain metals through the heating process, rather than in reduction. For example, heating with furnace 310 can be done to reduce the metal oxide to metal (as with iron oxides). Some metal ores, such as cuprite ($Cu_2O$), can be introduced into furnace 310 and heated to at least a temperature where rapid reduction of the ore to a metal occurs. Similarly, some metal ores can be introduced into furnace 310 and heated to at least a temperature where rapid oxidation of the ore to a metal or metal oxide occurs. In one example, for covellite, $CuS+1.5O_2=CuO+SO_2$. The metal oxide can then be reduced, acid leached and electroplated, or otherwise treated to recover the metal.

In one embodiment, the use of microwave energy for heating iron ores results in relatively low energy consumption. As such, furnace 310 in one embodiment is a compact and mobile unit. The portability of furnace 310 allows utilization of mined iron ores and many waste products containing iron ores in smaller quantities and with a reduced infrastructure footprint.

In one embodiment, microwave generators 320 within microwave pellet furnace 310 are operated in a spectrum of microwave frequencies from 300 megahertz to 300,000 megahertz. In addition, ultrasonic frequencies can be used to supplement the microwave frequencies, and in one embodiment, such ultrasound frequencies are 16,000 hertz and higher. In one embodiment, microwave generators 320 actually comprise a plurality of microwaves and/or also include the use of ultrasound frequency simultaneously or in series within one furnace 310.

In one embodiment, ultrasound vibration is used to assist the coalescence and consolidation of like minerals within the microwaved and/or auxiliary heated pellets. In one example, iron ore pellets consisting of reduced taconite iron ore, molten iron forms a dense core as the less dense silica is forced away from the forming core of iron, and flows toward the exterior of the pellet, and forms a slag. Ultrasound energy can be used to increase the speed of the coalescing of slag and reduced iron.

In some embodiments, microwave pellet furnace 310 is configured to operate with a reducing atmosphere in microwave zone 318 and direct heat zone 324 in order to assist in reduction of ores. In one example, microwave pellet furnace 310 is configured to operate with an oxygen rich atmosphere in order to assist in oxidation of ores.

In one embodiment, microwave pellet furnace 310 is configured for use with minerals that are not pelletized and/or blended with other minerals or other components. In one such example, furnace 310 can be used to process $FeS_2$ (pyrite, marcasite) minerals that have been previously screened and sized.

In one embodiment, microwave pellet furnace 310 is configured for processing minerals and contaminated materials (e.g. soils from Superfund Sites), not necessarily to process minerals, but to reduce, oxidize, or volatilize all or some components of the raw material and render it a more benign, useful, or recyclable material. In such cases, the furnace process gases drawn off by the vent and exhaust systems can be contained, processed, and/or treated to meet environmental remediation requirements.

Figure 7:
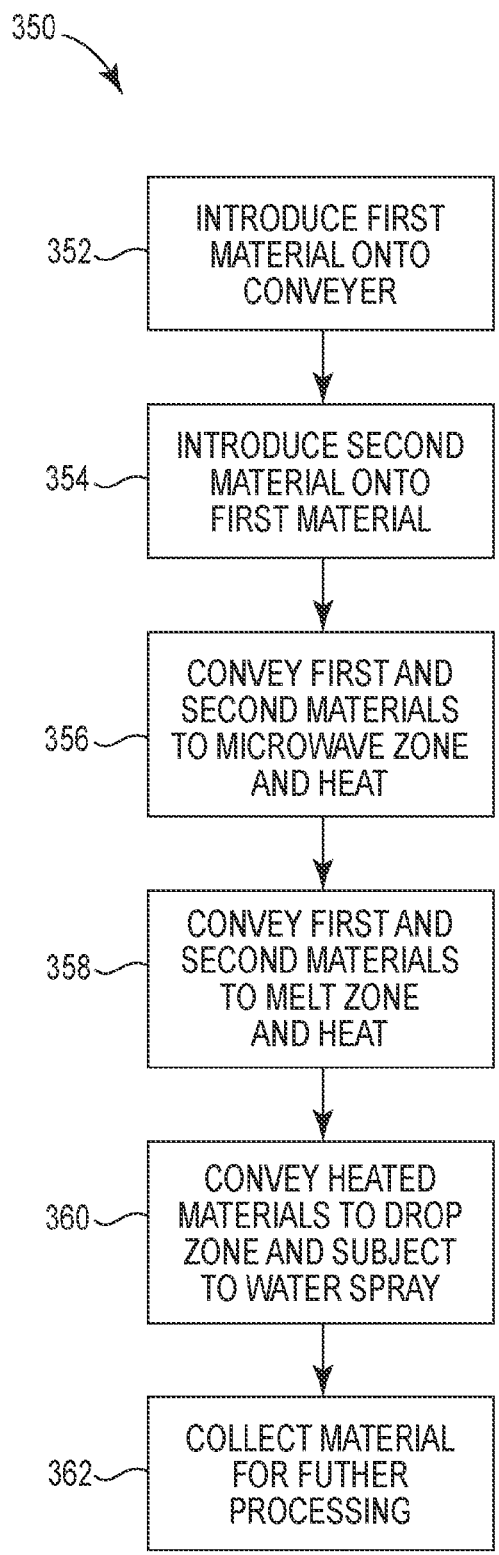
FIG. 7 is a flow diagram illustrating a material reducing process in a microwave furnace in accordance with one embodiment.

FIG. 7 is a flow diagram illustrating a mineral reduction process 350 in accordance with one embodiment. In one embodiment, process 350 is used to reduce iron ore to metallic iron by mixing the iron ore with a fluxing agent, a reducing agent, and a binder in order to produce an unfired pellet or briquette.

In process 350, a first material layer is introduced onto a conveyer, such as within furnace 310 or pellet furnace 36 above, at step 352. In one example, the first material layer is a ground limestone layer. Once on the conveyer, a second material layer is placed over the first material layer on the conveyer at step 354. In one example, the second material layer is an iron ore, such as a pelletized taconite ore. At step 356, the first and second material layers are conveyed through a microwave zone, where they are exposed to microwaves and heated.

In one example, the heating of the material layers will cause the second material layer, in one example the iron ore, to begin to reduce and metalize. At step 358 the first and second material layers are conveyed to a melt zone, where they are further exposed to heat, such as a traditional heat source like a gas furnace. This causes further reduction and metallization of the iron ore.

After the material is sufficiently reduced, it is conveyed to the drop zone at step 360. In one example, sufficient reduction occurs when 92% or higher metallization is achieved in the iron ore pellets. Also in one example, sufficient separation of iron from slag is achieved, in this case resulting in a silica content of the final pig iron product of 8% or less. At the drop zone, a cool water spray is directed at the heated material such that it spalls the hot slag and removes it from the iron nugget. At step 362, that material is collected for further processing.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A mineral recovery system comprising:
   a microwave cracking furnace configured to receive aggregated minerals and to subject them to microwave energy such that fractures occur between the bonded minerals of the aggregated minerals;
   a sonic crusher configured to receive the fractured minerals and to position the fractured minerals via elutriation adjacent an ultrasound source such that the fractured minerals are subjected to ultrasound energy causing further size reduction; and
   a microwave pellet furnace configured to receive the fractured and size-reduced minerals and to heat metal-containing materials within the minerals with microwave energy.

2. The mineral recovery system of claim 1 further comprising a crushing device configured to receive the aggregated minerals before the microwave cracking furnace and to mechanically crush the aggregated material into smaller pieces of aggregated minerals.

3. The mineral recovery system of claim 2 further comprising a sizing device configured to remove materials larger than a predetermined size before aggregated minerals are sent to the crushing device.

4. The mineral recovery system of claim 1 further comprising a agglomerating device configured to receive the fractured and size-reduced minerals from the sonic crusher and to form green pellets or briquettes.

5. The mineral recovery system of claim 4, wherein the agglomerating device is further configured to receive binder, reductant, and flux in order to form green pellets or briquettes.

6. The mineral recovery system of claim 1 further comprising a separator configured to receive the fractured and size-reduced minerals from the sonic crusher and to separate off selected minerals.

7. The mineral recovery system of claim 1, wherein the recovery system is configured to receive the aggregated minerals consisting of iron ores or other ores.

8. The mineral recovery system of claim 1, wherein the microwave cracking furnace further comprises:
   a main vessel configured for conveying the aggregated minerals consisting of at least a first and a second mineral bound together, the first and second minerals each having different differential thermal expansion or microwave energy absorption rates;
   a microwave source coupled adjacent the main vessel and configured to generate microwave energy; and
   a waveguide configured to focus the microwave energy from the microwave source onto the aggregated minerals such that the aggregated minerals are heated rapidly thereby inducing fractures in the bonded aggregated minerals due to the different differential thermal expansion rates.

9. The mineral recovery system of claim 1, wherein the sonic crusher further comprises:
   a pipe system comprising at least one elutriator;
   a pumping system configured to pump a slurry through the pipe system and the at least one elutriator; and
   a first ultrasound sonotrode configured proximate to the at least one elutriator.

10. The mineral recovery system of claim 1, wherein the microwave pellet furnace further comprises:
    a conveyor for conveying a first material layer, and a second material layer carried on the first material layer, through the furnace;
    a microwave heating zone configured for heating the second material layer with a microwave generator as the conveyer conveys the layers through the microwave heating zone, wherein the second material layer consists of a metal-containing material;
    a direct heat zone configured for heating the second material layer with a direct heat source as the conveyer conveys the layers through the direct heat zone; and
    a discharge for discharging the material layers out of the microwave furnace.

11. The mineral recovery system of claim 1, wherein at least one of the microwave cracking furnace and the microwave pellet furnace is enclosed to reduce or oxidize atmospheres or allowing a vacuum to be applied.

12. The mineral recovery system of claim 1, wherein the sonic crusher is enclosed so that a pressurized atmosphere may be applied to the crushing apparatus and its contents.

13. A mineral recovery system for non-metallic ores and ores containing native metallic elements comprising:
    microwave cracking furnace configured to receive aggregated minerals and to subject them to microwave energy such that fractures occur between the bonded minerals of the aggregated minerals; and
    a sonic crusher configured to receive the fractured minerals and to position the fractured minerals via elutriation adjacent an ultrasound source such that the fractured minerals are subjected to ultrasound energy causing further size reduction.

14. The mineral recovery system of claim 13, wherein the microwave cracking furnace is enclosed to reduce or oxidize atmospheres or allowing a vacuum to be applied.

15. The mineral recovery system of claim 13, wherein the sonic crusher is enclosed so that a pressurized atmosphere may be applied to the crushing apparatus and its contents.

* * * * *